United States Patent [19]
Bailey

[11] 3,790,877
[45] Feb. 5, 1974

[54] POWER DELIVERY SYSTEM FOR A TANK LOAD CHARACTERIZED BY SERIES-CONNECTED INVERTER BRIDGES AND A HIGH VOLTAGE SOURCE

[75] Inventor: Ronald B. Bailey, Waynesboro, Va.

[73] Assignee: General Electric Company, Philadelphia, Pa.

[22] Filed: Feb. 2, 1973

[21] Appl. No.: 328,893

[52] U.S. Cl. ............................ 321/27 R, 321/45 R
[51] Int. Cl. ............................................ H02m 7/00
[58] Field of Search ........................ 321/27 R, 45 R

[56] References Cited
UNITED STATES PATENTS

| | | | |
|---|---|---|---|
| 3,390,320 | 6/1968 | Kammiller et al. | 321/27 R |
| 3,408,551 | 10/1968 | Kuba | 321/45 R X |
| 3,328,667 | 6/1967 | Shaneman | 321/45 R |
| 3,325,719 | 6/1967 | Gillet | 321/45 R |
| 3,373,338 | 3/1968 | Corey et al. | 321/27 R |

*Primary Examiner*—William M. Shoop, Jr.

[57] ABSTRACT

Electric power conversion apparatus, including series-connected current-source inverter bridges, safely delivers alternating current to a tank load from a source of unipolarity voltage of relatively high magnitude. Each inverter bridge comprises at least one pair of alternately conducting thyristors and a separate transformer. The secondary windings of the respective transformers are connected in parallel with one another to the load, and the inverter bridges are connected in series with each other and with a current smoothing reactor to the source of high voltage which is divided among the bridges. The source voltage can therefore be higher than the individual voltage handling capacity of the thyristors.

2 Claims, 1 Drawing Figure

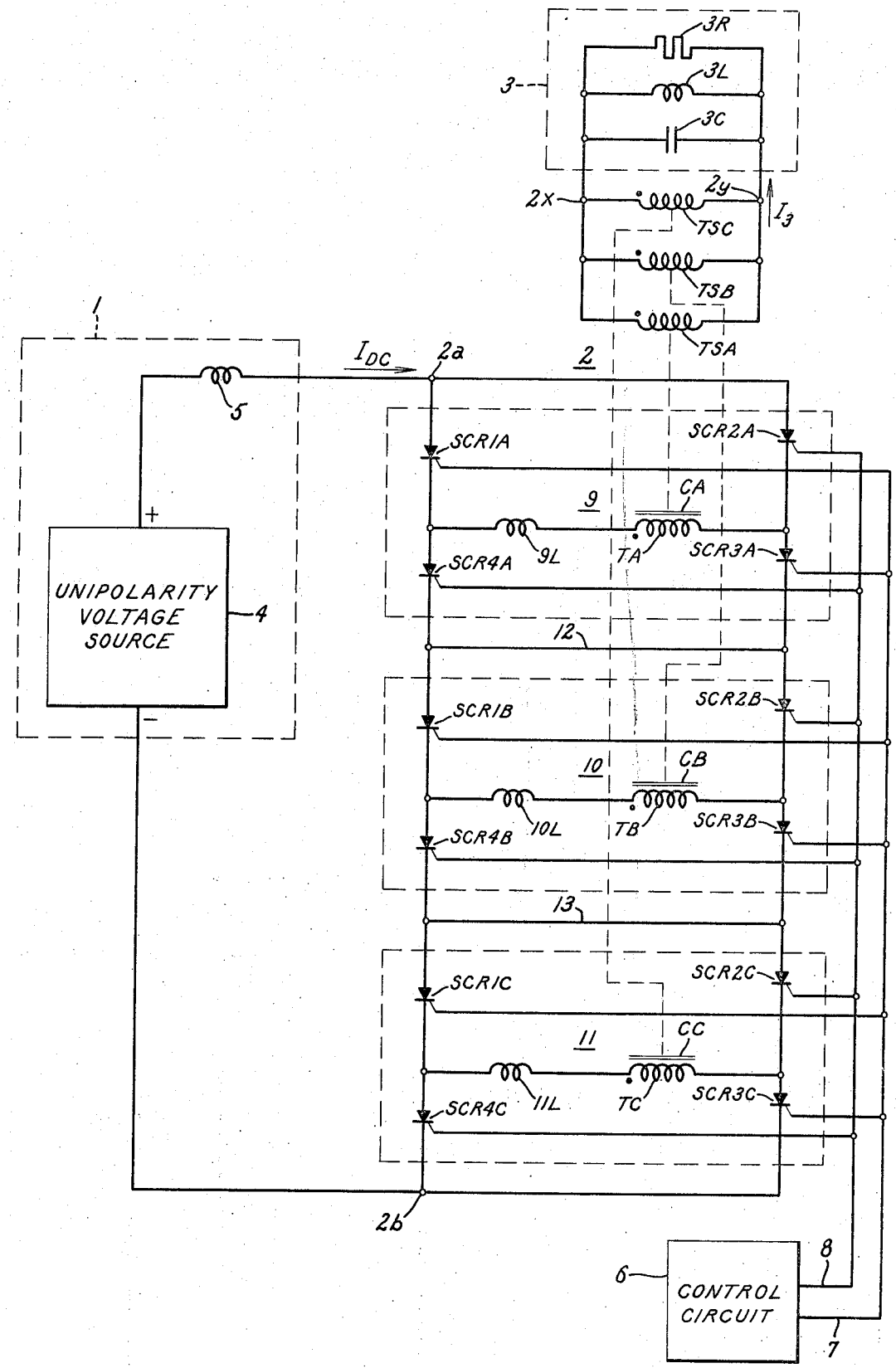

POWER DELIVERY SYSTEM FOR A TANK LOAD CHARACTERIZED BY SERIES-CONNECTED INVERTER BRIDGES AND A HIGH VOLTAGE SOURCE

BACKGROUND AND OBJECTS OF THE INVENTION

This invention relates generally to electric power conversion apparatus and more particularly to a high-voltage electric inverter adapted to supply alternating current to a tank load.

The following patents, now known to applicant, are representative of relevant prior art approaches in this area of technology: U.S. Pat. Nos. 2,953,754 (Roesel Jr.); 3,259,831 (Dortort); 3,355,600 (Mapham); 3,373,338 (Corey et al.); and Canadian Pat. No. 694,850.

With the commercial development of high-power solid-state controlled switching elements (often referred to as thyristors), there has been a growing interest in designing static conversion apparatus employing such components for a variety of power delivery applications.

Commercially available high-power thyristors, like other semiconductor devices, have specified maximum voltage ratings (e.g., 1,200 PRV). For higher voltage applications it has been a common practice to interconnect a plurality of individual thyristors in series and to operate them in unison to form a high-voltage electric valve. Such a valve can then be combined with other similar valves in various arrangements of high-voltage electrical conversion apparatus, such as controlled rectifiers, inverters, and switches.

There are several disadvantages in using series-connected thyristor valves in high-voltage inverters. The serially connected thyristors may require relatively powerful R-C voltage dividing circuits connected in shunt therewith to maintain proper voltage sharing during transient conditions. Also, special circuitry may be necessary to preclude an over voltage on a thyristor which turns on slower than other simultaneously triggered thyristors in the same valve. Furthermore, if one thyristor were to fail (i.e., lose its blocking ability), the companion non-conductive but still functional thyristors will be exposed to damage by the additional voltage that they must withstand.

In the inverter art it has heretofore been suggested to increase the voltage handling capacity of a transistorized inverter employing single-transistor valves by connecting a plurality of identical inverter bridges in series with one another across a high-voltage d-c power source and operating the respective bridges in unison. Proper voltage sharing among the valves comprising the separate bridges is normally ensured by transformer coupling. Since each valve of each bridge in such an arrangement is only a single switching element, this approach will avoid some of the disadvantages of series-connected thyristor valves. Nevertheless, in the prior art practices with which I am presently familiar there is still a danger that if a valve in one bridge should fail those in series therewith could be subjected to over voltage.

Accordingly, it is a general objective of my invention to provide an improved high-voltage, thyristor-composed inverter wherein the risk of excess voltage on any non-conducting thyristor is minimized.

It is a further objective of my invention to provide an electric power delivery system comprising plural thyristor-composed, serially-connected inverter bridges wherein any abnormal disturbance in one bridge has negligible adverse affect on the others.

SUMMARY OF THE INVENTION

In carrying out my invention in one form, a "tank load" is supplied with alternating current by an electric power system comprising a d-c source, a current smoothing inductor, and a high-voltage inverter section. A "tank load" as used herein refers to a load circuit comprising the combination of resistance, inductance, and capacitance, one example being a parallel-tuned circuit formed by connecting a bank of capacitors across an induction heating coil. The inverter section of the system comprises a pair of input terminals connected via the smoothing inductor to the d-c source, a pair of output terminals connected to the tank load, and a plurality of current-source, load-commutated electric inverter bridges connected in series with each other across the input terminals. By "load-commutated" I mean that commutation of the periodically conducting controllable valves which form each of the inverter bridges, is effectuated by the voltage developed across the tank load. In accordance with my invention, each inverter bridge comprises first and second alternately conducting thyristors, a transformer having its own core with separate primary and secondary windings thereon, and means for interconnecting the thyristors and the primary winding so that current from the source can flow through the primary winding in one direction when the first thyristor is conducting and in the opposite direction when the second thyristor is conducting. The secondaries of the transformers of the respective bridges are all connected in parallel with one another between the aforesaid output terminals, whereby alternating current is supplied to the connected load. Periodically operative control means is provided for simultaneously triggering all of the first thyristors of the respective bridges and, alternately therewith, for simultaneously triggering all of the second thyristors of the respective bridges. The frequency of the output current depends on the triggering rate of the thyristors and is ordinarily in the "middle" frequency range (e.g., 100 to 4,000 Hz.).

In operation, the above-summarized system causes a square wave of current to be switched into the tank load, whereby there is developed across the load an alternating voltage of sinusoidal waveform whose RMS magnitude is a function of both the load impedence and the magnitude of current being fed to the input terminals of the inverter section. Assuming that the load is a parallel-resonant tank circuit with a Q larger than 1.5 (as is usually the case), this load-generated voltage will have a relatively stiff sinusoidal waveform. The load voltage is reflected back into the primary winding of each transformer, and the maximum voltage that the thyristors of each bridge normally have to withstand is established by this voltage and the transformer turns ratio. If a thyristor in one of the bridges were to fail, it will effectively short circuit the associated primary winding. However, in the other sound bridges the non-conducting thyristors experience no immediate increase in blocking voltage which remains dependent on the relatively constant load voltage, and the excess source voltage will now appear across the smoothing inductor and determine the rate of ensuing increase in the current input to the inverter section.

BRIEF DESCRIPTION OF THE DRAWING

My invention will be better understood and its various objects and advantages will be more fully appreciated from the following description taken in conjunction with the accompanying drawing which is a schematic diagram of an electric power system embodying my invention.

DETAILED DESCRIPTION OF THE PREFERRED EMBODIMENT

As can be seen in the drawing, my system comprises a current source 1 and an inverter section 2 which are suitably constructed and arranged to supply alternating current of desired frequency (such as 1 KHz) to a single-phase tank load 3. The tank load 3 comprises resistance 3R and inductance 3L (which may represent a ferromagnetic workpiece in an induction heating coil) shunted by a capacitor bank 3C, and this parallel combination is tuned to exhibit a slightly leading power factor when excited by the alternating current $I_3$ which the inverter section 2 supplies thereto.

The load current $I_3$ is derived from the current source 1 which comprises a source 4 of unipolarity voltage and a current smoothing inductor or choke 5. The voltage source 4 may take any suitable form, such as a well known fullwave rectifier circuit whose a-c terminals are connected to a readily available supply of 3-phase alternating voltage having a fixed main frequency (e.g., 60 Hz). In the interest of efficient rectifier utilization and lower losses, the magnitude of the voltage output of the source 4 is preferably selected to be relatively high. The choke 5 is coupled to the d-c terminals of the source 4 to reduce the rectifier ripple in the output current so as to provide a relatively smooth direct current, denoted as $I_{DC}$. The relatively constant current $I_{DC}$ is fed to the input terminals 2a and 2b of the inverter section 2.

The inverter section 2 includes the pair of d-c input terminals 2a, 2b, a pair of a-c output terminals 2x and 2y which are connected to the tank load 3, and three current-source, load-commutated electric inverter bridges 9, 10, and 11 connected in series with each other across the input terminals 2a and 2b. As illustrated each of the inverter bridges is a full bridge comprising four thyristors and a separate transformer. More specifically, bridge 9 comprises first and second alternately conducting thyristors SCR1A and SCR2A whose anodes are connected in common to the relatively positive input terminal 2a of the inverter section, a third thyristor SCR3A connected in series with the second thyristor but arranged to be conductive concurrently with the first thyristor, a fourth thyristor SCR4A connected in series with the first thyristor but arranged to be conductive concurrently with the second thyristor, and a conductor 12 which interconnects the cathodes of the third and fourth thyristors. The transformer associated with the bridge 9 has its own core CA on which are disposed separate primary and secondary windings TA and TSA, respectively. The secondary winding TSA is connected between the output terminals 2x and 2y of the inverter section. Means is provided for connecting the primary winding TA between the juncture of the first and fourth thyristors SCR1A and SCR4A and the juncture of the second and third thyristors SCR2A and SCR3A as shown. With this arrangement, the current $I_{DC}$ from the source 1 can flow through the primary winding TA in one direction when the pair of first and third thyristors are conducting and in the opposite direction when the pair of second and fourth thyristors are conducting. In series with the transformer primary winding there is inductance 9L (which in practice may be inherent in the primary winding itself) to limit the rate of change of current when commutating from one pair of thyristors to the other at the end of each half cycle.

Each of the other two bridges 10 and 11 is identical to bridge 9. As can be seen in the drawing, the anodes of the first and second thyristors SCR1B and SCR2B of the bridge 10 are connected in common to the conductor 12, and in the same bridge the cathodes of the third and fourth thyristors SCR3B and SCR4B are interconnected by a conductor 13. Similarly, in the third bridge 11 the anodes of the first and second thyristors SCR1C and SCR2C are connected in common to the conductor 13, and the cathodes of the third and fourth thyristors SCR3C and SCR4C are connected in common to the negative input terminal 2b of the inverter section 2. As is clearly shown in the drawing, the secondary windings TSA, TSB, and TSC of the three separate transformers which are respectively associated with the three bridges 9, 10, and 11 are connected in parallel relation to one another between the a-c output terminals 2x and 2y of the inverter section. The relative polarities of the primary and secondary windings of all three transformers are indicated by conventional dot notations.

Corresponding thyristors of the respective series-connected inverter bridges 9, 10, and 11 are all triggered synchronously by associated control means 6 which will soon be described. That is, each time the first and third thyristors of the bridge 9 are triggered, the first thyristors and the third thyristors of the other two bridges are simultaneously triggered, whereupon the input current $I_{DC}$ flows serially into the dot end of all three transformer primary windings TA, TB, and TC. Alternately with this event, in a cyclically recurring pattern, the second thyristors and the fourth thyristors of all three bridges are triggered simultaneously with one another. When the latter string of thyristors is triggered, current changes direction in the transformer primary windings, being commutated from the previously conducting string of odd-numbered thyristors to the even numbered string by the action of the load voltage. The frequency of the alternating current $I_3$ that is consequently supplied to the load is determined by the triggering rate of the respective strings of thyristors.

The triggering rate or frequency at which the thyristors are fired is controlled by the circuit 6 which runs the inverter section 2. This circuit which is independent of the aforsaid transformers is operative to provide a first train 7 of appropriate gate pulses at a desired repetition rate (e.g., 1,000 Hz) for periodically triggering the first and third thyristors of all three bridges simultaneously with one another, and it also provides a second train 8 of similar pulses for periodically triggering the second and fourth thyristors of all three bridges simultaneously with one another. The pulses in the second train are displaced in time with respect to the pulses in the first train by one-half of the interval between consecutive pulses of the first train. In practice the control circuit 6 can be part of an angle regulating system as disclosed in my prior patent application Ser. No. 162,430 filed on July 14, 1971, and assigned to the General Electric Co. now U.S. Pat. No. 3,718,852.

The total load current $I_3$ is the sum of the alternating currents supplied by the transformer secondary windings TSA, TSB, and TSC of the three inverter bridges 9, 10, and 11. The magnitude of current in each secondary winding is equal to $NI_{DC}$, where N is the ratio of primary to secondary turns of the transformer windings. The total current, which normally is $3NI_{DC}$, establishes the magnitude of load voltage which is a relatively constant sinewave due to the high Q of the tank load. Thus the system is characterized by a "stiff" load voltage. This voltage, as reflected back through the associated transformer, determines the maximum magnitude of voltage impressed on the non-conducting pair of thyristors in each bridge. The maximum magnitude of impressed voltage is only a fraction of the higher voltage output of the unipolarity voltage source 4. By using transformers having closely matched turns ratios, equal shares of the applied voltage are assumed by the respective bridges without requiring any auxiliary voltage balancing circuitry. It will now be apparent that the voltage handling capacity of the inverter section 2 of my system appreciably exceeds the maximum voltage rating of any of its constituent bridges or thyristors.

In the abnormal event of a failed thyristor in one of the bridges of the inverter section 2, none of the remaining sound thyristors will be over-stressed. This advantageous result can best be understood by considering the repercussions of such a failure. Assume, by way of example, that the second thyristor SCR2A in the first bridge 9 has lost its blocking ability and that the odd-numbered pairs of thyristors have been triggered. The second and third thyristors SCR2A and SCR3A in the first bridge now form a short circuit for the input current $I_{DC}$, and no current will be supplied to the load through the primary winding TA of the transformer associated with this bridge. Although no voltage appears between terminal 2a and conductor 12, the load voltage remains relatively constant (because of its large stored energy) resulting in constant primary voltages at TB and TC. The voltages across the thyristors in the inverter bridges 10 and 11 are a direct result of their primary voltages and therefore cannot increase unless the load voltage increases. Since the load voltage is stiff and increases slowly, suitable steady state protective means (not shown) could be provided for safely disconnecting the inverter section from the source in response to the magnitude of the load voltage exceeding a predetermined normal level.

While I have shown and described a particular embodiment of my invention, it will be obvious to persons skilled in the art that various changes and modifications may be made without departing from its broader aspects, and I intend herein to cover all such changes and modifications as fall within the true spirit and scope of my invention.

What I claim as new and desire to secure by letters patent of the United States is:

1. An electric power system for delivering alternating current to a tank load, comprising:
   a. a source of unipolarity voltage of relatively high magnitude;
   b. a current smoothing inductor;
   c. an inverter section having a pair of input terminals connected via said inductor to said source, a pair of output terminals connected to the tank load, and a plurality of current-source, load-commutated electric inverter bridges connected in series with each other across said input terminals, each of said bridges including:
      i. first and second alternately conducting thyristors,
      ii. a transformer having its own core and separate primary and secondary windings thereon, said secondary winding being connected between said output terminals, and
      iii. means for interconnecting said thyristors and said primary winding so that current from said source can flow through said primary winding in one direction when said first thyristor is conducting and in the opposite direction when said second thyristor is conducting; and
   d. control means independent of the transformers in said inverter bridges for running said inverter section at a desired frequency, said control means being operative periodically to trigger the first thyristors of all of said bridges simultaneously with one another and, alternately with the triggering of the first thyristors, to trigger the second thyristors of all of said bridges simultaneously with one another.

2. The electric power system of claim 1 wherein the interconnecting means of each of said inverter bridges comprises third and fourth alternately conducting thyristors, said third thyristor being connected in series with said second thyristor and being conductive concurrently with said first thyristor, said fourth thyristor being connected in series with said first thyristor and being conductive concurrently with said second thyristor, said primary winding being connected between the juncture of said first and fourth thyristors and the juncture of said second and third thyristors, and wherein said control means is arranged periodically to trigger all of the first and third thyristors and alternately to trigger all of said second and fourth thyristors.

* * * * *